United States Patent [19]
Budd

[11] Patent Number: 5,287,118
[45] Date of Patent: Feb. 15, 1994

[54] LAYER FREQUENCY SELECTIVE SURFACE ASSEMBLY AND METHOD OF MODULATING THE POWER OR FREQUENCY CHARACTERISTICS THEREOF

[75] Inventor: Christopher Budd, Bristol, United Kingdom

[73] Assignee: British Aerospace Public Limited Company, London, England

[21] Appl. No.: 713,263

[22] Filed: Jun. 11, 1991

[30] Foreign Application Priority Data

Jul. 24, 1990 [GB] United Kingdom ............... 9016231

[51] Int. Cl.$^5$ ............................................ H01Q 15/23
[52] U.S. Cl. .................................... 343/909; 343/754
[58] Field of Search ............... 343/909, 910, 911 R, 343/753, 754, 755; 342/5, 6, 11

[56] References Cited

U.S. PATENT DOCUMENTS

| | | | |
|---|---|---|---|
| 2,959,784 | 11/1960 | Pierce | 343/754 X |
| 3,979,755 | 9/1976 | Sandoz et al. | 343/754 |
| 4,169,268 | 9/1979 | Schell et al. | 343/909 |
| 4,307,404 | 12/1981 | Young | 343/754 |
| 4,358,771 | 11/1982 | Hsieh | 343/911 R X |
| 4,742,358 | 5/1988 | Raber et al. | 343/909 X |

FOREIGN PATENT DOCUMENTS

| | | | |
|---|---|---|---|
| 1490696 | 6/1989 | U.S.S.R. | H01Q 15/00 |
| 782042 | 8/1957 | United Kingdom | 343/753 |
| 1416343 | 12/1975 | United Kingdom . | |
| 1462438 | 2/1989 | United Kingdom . | |

OTHER PUBLICATIONS

Onoe et al. "Radar Reflectors with Controllable Reflection", Electronics and Communications in Japan, vol. 63, No. 3, Mar. 1980, pp. 51-58, New York.

*Primary Examiner*—Benny T. Lee
*Attorney, Agent, or Firm*—Cushman, Darby & Cushman

[57] ABSTRACT

The power or frequency characteristics of a layered frequency selective surface assembly (1) having a dielectric substrate layer (2) and, superimposed therewith at a spacing (X) therefrom, at least one layer (3) of electrically conductive elements (4) disposed in an array, is modulated by moving at least one layer (2, 3) relative to the or each other layer (2, 3). The layers (2, 3) maybe substantially planar or substantially non-planar and may be disposed substantially parallel to one another. Relative movement between the layers (2, 3) may retain the substantially parallel orientation or may not retain the substantially parallel orientation. The relative movement may have the effect of changing the spacing between the layers (2, 3) for example to tilt, skew or rotate one layer relative to the or each other layer.

12 Claims, 3 Drawing Sheets

LAYER FREQUENCY SELECTIVE SURFACE ASSEMBLY AND METHOD OF MODULATING THE POWER OR FREQUENCY CHARACTERISTICS THEREOF

FIELD OF THE INVENTION

This invention relates to a layered frequency selective surface assembly and to a method of modulating the power or frequency characteristics thereof, particularly, but not exclusively, suitable for use with radar applications.

BACKGROUND OF THE INVENTION

Passive planar frequency selective surface assemblies are known in the form of an array of identical electrically conductive elements printed on a flat dielectric substrate. Such known assemblies have the useful property, by virtue of resonances within and between the conductive elements, that the transmission and reflection of microwave energy by the surface of the assembly is strongly frequency dependent. This allows the assembly to be used in the construction of, for example multi-band reflector antennae, in which the routing and possible transmission of microwave signals is strongly frequency dependent. Thus the assembly can be used to reflect signals in one frequency band and to pass signals in another frequency band. Additional to such two layer assemblies, assemblies are also known with a plurality of layers of electrically conductive elements.

Recent research has proposed that the characteristics of a frequency selective surface assembly can be electronically altered on a very short time scale by switching or otherwise controlling active electronic devices embedded into the individual electrically conductive elements. Such an active frequency selective surface assembly could have many potential applications, but embedding electronic devices in individual electrically conductive elements is difficult and would make such assemblies expensive and difficult to make and use.

OBJECTS OF THE INVENTION

Thus one object of the present invention is to provide an improved layered frequency selective surface assembly with which the power or frequency characteristics thereof can relatively easily be modulated without great expense. Another object of the present invention is to provide a method of modulating the power or frequency characteristics of such a layered frequency selective surface assembly. Preferably, according to a further object, such layered frequency selective surface assemblies should be capable of relatively rapid modulation control.

These and other objects and advantages of the present invention will become more apparent from details disclosed in the following specification where preferred embodiments of the invention are disclosed.

SUMMARY OF THE INVENTION

According to one aspect of the present invention there is provided a method of modulating the power or frequency characteristics of a layered frequency selective surface assembly having a dielectric substrate layer and, superimposed therewith at a spacing therefrom, at least one layer of electrically conductive elements disposed in an array, in which at least one layer is selectively moveable with respect to at least one other layer to modulate such characteristics.

Preferably said layers are substantially planar or, alternatively, substantially non-planar, and disposed substantially in parallel to one another and in which said relative movement is effective in a manner such as to retain such substantially parallel disposition, so as to modulate the frequency characteristics.

Conveniently said layers are substantially planar or, alternatively substantially non-planar, and disposed substantially in parallel to one another and in which said relative movement is effected in a manner such as not to retain such substantially parallel disposition.

Advantageously for a substantially fixed frequency, the direction of power transmission from the layered frequency selective surface assembly is modulated by moving one layer in a substantially non-parallel manner relative to the at least one other layer.

Preferably this relative movement is effected by pivoting or rotating the one layer relative to the at least one other layer about an axis normal to all the layers so as to change the relationship of the array of electrically conductive elements to the dielectric substrate layer.

Conveniently the characteristics are modulated at least in part by varying the spacing between said layers.

Advantageously the relative movement between said layers is brought about mechanically, electro-mechanically, hydraulically or pneumatically.

The relative movement between said layers maybe brought about by distortion of one layer.

According to a further aspect of the present invention there is provided a layer frequency selective surface assembly including a dielectric substrate layer, at least one layer of electrically conductive elements disposed in an array, which at least one conductive element layer is superimposed with and spaced from the substrate layer, and means for moving the respective layers relative to each other to modulate the power or frequency characteristics of the assembly.

Preferably said layers are substantially planar or, alternatively substantially non-planar, in form and disposed substantially parallel to one another.

Conveniently said moving means are operable to retain said substantially parallel disposition.

Alternatively said moving means may also be made operable so as not to retain said substantially parallel disposition.

Conveniently said moving means are operable to move one layer in a substantially non-parallel manner relative to the at least one other layer.

Advantageously said moving means are operable to pivot or rotate one layer about an axis normal to all layers and relative to the at least one other layer.

Preferably said moving means are operable at least in part to vary the spacing between said layers.

Conveniently said moving means are operable to bring about said relative movement mechanically, electromechanically, hydraulically or pneumatically.

The moving means may be operable to distort the shape of one layer relative to the at least one other layer.

DESCRIPTION OF THE DRAWINGS

For a better understanding of the present invention, and to show how the same may be carried into effect, reference will now be made, by way of example, to the accompanying drawing, in which.

DESCRIPTION OF THE EMBODIMENTS OF THE INVENTION

Figure 1:
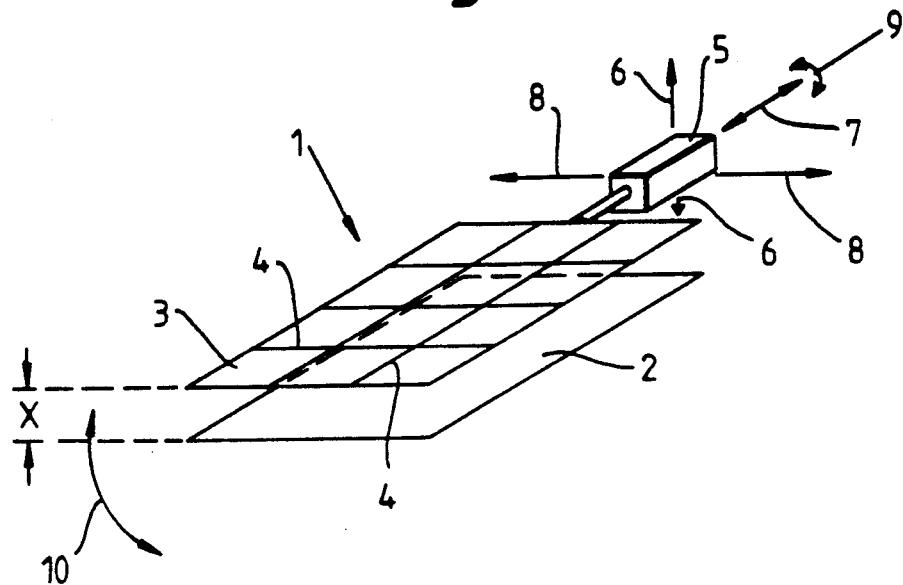
FIG. 1 is a diagrammatic perspective view of a layered frequency selective surface assembly according to one embodiment of the present invention.
Figure 2:
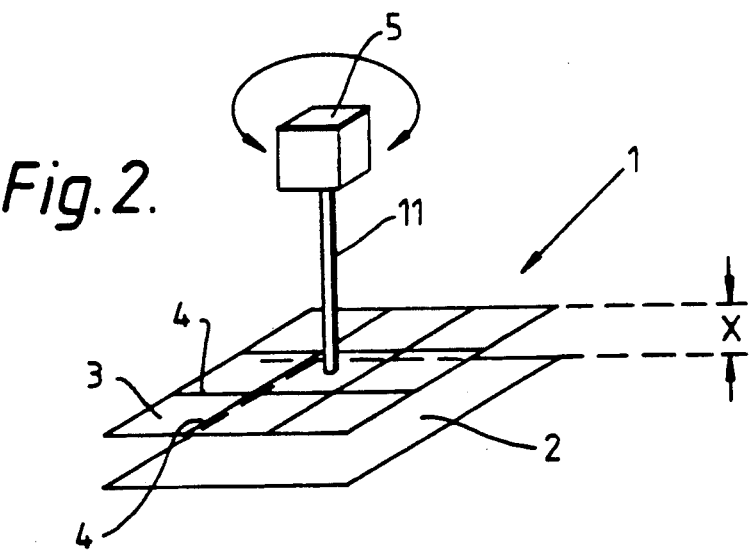
FIG. 2 is a diagrammatic perspective view of a layered frequency selective surface assembly according to a further embodiment of the present invention.

A layered frequency selective surface assembly of the present invention, generally indicated at 1 in FIGS. 1 and 2 of the present application includes a dielectric substrate layer 2 and at least one layer 3 of electrically conductive elements 4 disposed in an array which may conveniently be of the grid form illustrated in FIGS. 1 and 2. The conductive element layer 3 is superimposed with and spaced from the substrate layer 2 at a spacing X. The assembly also includes means generally indicated at 5 for moving a first layer 3 relative to at least one other layer 2 to modulate the power or frequency characteristics of the assembly. In the illustrated embodiments, a shift/rotate device 5 is arranged to move the electrically conductive element layer 3 relative to the substrate layer 2 although the reverse could apply if desired. Additionally, for convenience, assembly 1 of the invention has been shown with only two layers 2 and 3 but it is to be understood, however, that a plurality of layers 3 can be provided each separated from one another, superimposed over one another and moveable either singularly or together relative to one another.

The power or frequency characteristics of a two layer assembly 1 are strongly dependent on the spacing between the two layers 2 and 3. Hence the properties of an assembly of two layers 2 and 3 arranged substantially parallel to one another in overlying relationship and separated from one another by a variable spacing X of the order of a quarter of a wavelength can be switched or controlled rapidly, on a timescale significantly shorter than a second, by moving one layer relative to the other, while keeping the two layers substantially parallel. This can be used for example to alter the frequency characteristics of a wave filter in a reflector antennae. Thus in the embodiment of FIG. 1, the relative movement of the surfaces 2 and 3 takes place in the direction of the arrows 6.

In the embodiment of the invention illustrated in FIGS. 1 and 2 the layers 2 and 3 are shown as being substantially planar and sheet like in form, disposed substantially parallel to one another. Movement of the layers 2 and 3 may not be towards and away from one another to vary the size of the spacing X but could be carried out by a shift/rotate device 5 to retain the substantially parallel disposition of the layers 2 and 3. As shown in FIG. 1, movement may be in the direction of arrow 7 so as to move layer 3 backwards and forwards across layer 2 to vary relative position of elements 4 with respect to the layer 2; or maybe in a transverse direction as shown by arrows 8.

Alternatively, a shift/rotate device 5 may be operable so as not to retain the substantially parallel disposition of the layers 2 and 3. As shown in FIG. 1, movement of layer 3 with respect to layer 2 maybe rotational about an axis parallel to the plane of layer 2 in the direction of arrow 9 or maybe a pivotal movement about a shift/rotate device 5 in the direction of arrow 10 so as to make the spacing X variable between the two layers 2 and 3; more specifically, between the layer ends nearest to the shift/rotate device 5 and the layer ends furthest away from the shift/rotate device 5. In other words, the spacing between the two layers 2 and 3 can be constant along their length or variable such that the spacing at the ends furthest away from the shift/rotate device 5 can be less than or greater than the spacing between the ends nearest to the shift/rotate device 5. In this alternate embodiment, the shift/rotate device 5 is operable to move the layer 3, relative to the layer 2, in a substantially non-parallel manner which could when used with an antennae provide some degree of beam steering.

In the embodiment of FIG. 2 of the accompanying drawings, a shift/rotate device 5 is operable to pivot or rotate the layer 3 relative to the layer 2 about an axis or axle 11 normal to the planes containing the layers 2 and 3. This has the effect of changing the registration of the elements 4 with the substrate layer 2.

Figure 3:
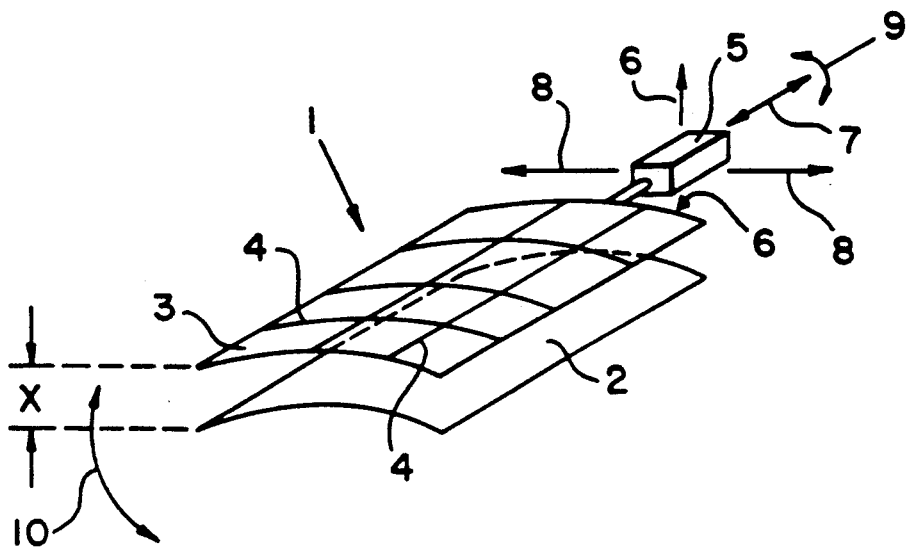
FIGS. 3 and 4 illustrate yet alternative embodiments, related to the embodiments in FIGS. 1 and 2, but provided with non-planar surfaces instead.
Figure 4:
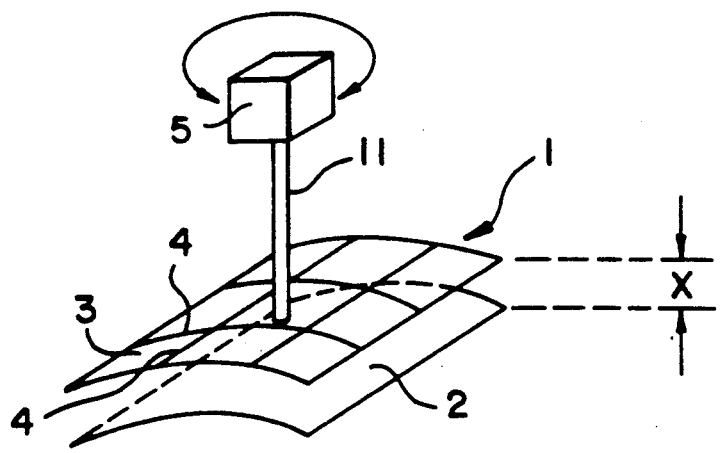

On an alternative, illustrated in FIGS. 3 and 4, layers 2 and 3 need not be substantially planar but can be substantially, non-planar, for example curved. All the features discussed in connection with the embodiment of FIGS. 1 and 2 can be utilized with layers 2 and 3 being non-planar as in FIGS. 3 and 4, respectively.

In the foregoing, a shift/rotate device 5 can take any convenient form such as for example mechanical, electromechanical, hydraulic or pneumatic.

Figure 5:
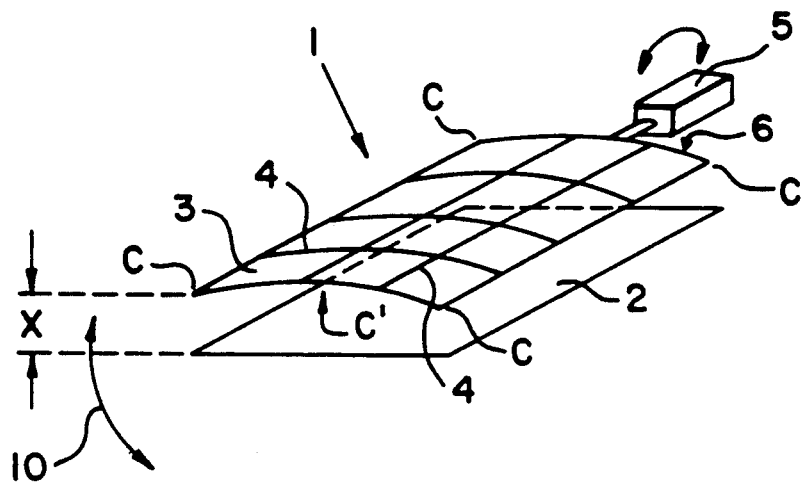
FIGS. 5 and 6 illustrate yet further alternative embodiments of the present invention showing a distorted layer surface combined with a non-distorted layer surface.
Figure 6:
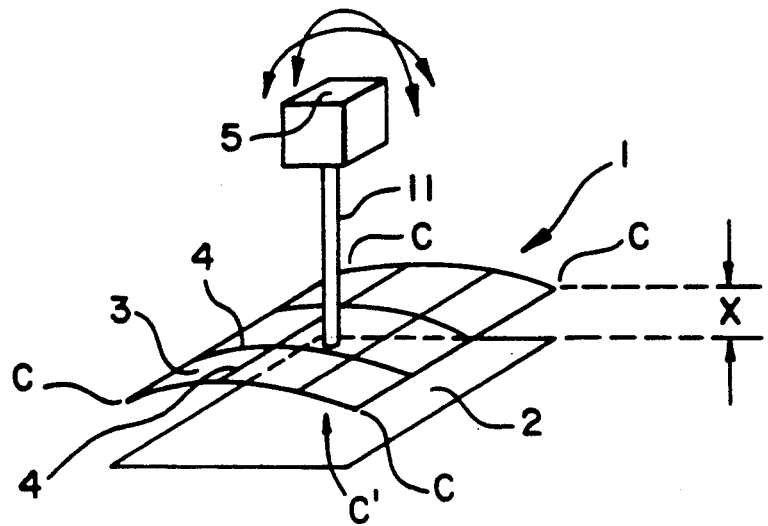

In yet another alternative embodiment, as illustrated in FIGS. 5 and 6, only one layer 2 or 3 may be made substantially planar in form and the other substantially in form. Indeed movement of one layer relative to the other (others) layer may be by means of distorting the one layer. Such distortion could be used to provide a microwave lens structure. The distortion can be achieved, for example, using shift/rotate device 5 to lift center c' while maintaining layer corners c in fixed position. The method and asssembly of the present invention although primarily intended for radar uses could also be used for optical and infra-red filters. The power or frequency characteristics of the assembly are modulated by relative movement between layers 2 and 3 in the manner described to vary the amount of power transmitted and/or direction of the power transmission for a fixed frequency; or when used for a filter, to vary or modulate the cut-off frequency of the filter. The degree of relative movement can be very small and effectively varied rapidly to provide an easily controllable high speed switching action in a relatively cheap and simple manner.

Various modifications and alterations may be made to the embodiments of the present invention described and illustrated, within the scope of the present invention as defined in the following claims.

What is claimed is:

1. A layered frequency selective surface assembly device comprising:
   a dielectric substrate layer:
   at least one conductive layer of electrically conductive elements arranged in array configuration, said at least one conductive layer overlapping and spaced apart from said dielectric substrate layer; and layer positioning means, coupled to one of either said dielectric substrate layer and said at least one conductive layer, for selectively varying the distance between the dielectric substrate layer and said at least one conductive layer so as to tune the layered frequency selective surface assembly device to a position where externally provided signals are either reflected or accepted in accordance with each signal's characteristics.

2. The device of claim 1, wherein said dielectric substrate layer and said at least one conductive layer are initially disposed in parallel to accept an initial signal response having predetermined signal characteristics, and are variably positioned in non-parallel fashion to accept a signal response different from said initial signal response.

3. The device of claim 2, wherein said layer positioning means selectively varies the position between the dielectric substrate layer and said at least one conductive layer, initially disposed in parallel, by pivoting the respective layer coupled thereto along an axis which is normal to the initial parallel direction of said dielectric substrate layer and the at least one conductive layer.

4. The device of claim 2, wherein said externally provided signals are accepted or reflected on the basis of the frequency characteristics of each signal.

5. The device of claim 2, wherein said externally provided signals are accepted or reflected on the basis of the power characteristics of each signal.

6. The device of claim 1, wherein said externally provided signals are accepted or reflected on the basis of the frequency characteristics of each signal.

7. The device of claim 1, wherein said externally provided signals are accepted or reflected on the basis of the power characteristics of each signal.

8. The device of claim 1, wherein said dielectric substrate layer and said at least one conductive layer are both non-planar shaped.

9. The device of claim 1, wherein said dielectric substrate layer and said at least one conductive layer are both substantially planar shaped.

10. The device of claim 1, wherein said layer positioning means selectively varies the position between the dielectric substrate layer and said at least one conductive layer by variably changing a parallel distance therebetween.

11. The device of claim 1, wherein said dielectric substrate layer and said at least one conductive layer are initially disposed in parallel to accept an initial signal response having predetermined signal characteristics, and are variably positioned to a different parallel position to accept a signal response different from said initial signal response.

12. The device of claim 11, wherein said layer positioning means selectively varies the position between the dielectric substrate layer and said at least one conductive layer, initially disposed in parallel, by pivoting the respective layer coupled thereto along an axis which is normal to the initial parallel direction of said dielectric substrate layer and the at least one conductive layer.

* * * * *